United States Patent
Lin et al.

(10) Patent No.: US 11,917,322 B2
(45) Date of Patent: *Feb. 27, 2024

(54) OPTICAL MODULE HAVING SYMMETRICAL OPAQUE LAYER

(71) Applicant: PixArt Imaging Inc., Hsin-Chu County (TW)

(72) Inventors: Jung-Tai Lin, Hsin-Chu County (TW); En-Feng Hsu, Hsin-Chu County (TW)

(73) Assignee: PIXART IMAGING INC., Hsin-Chu County (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/860,352

(22) Filed: Jul. 8, 2022

(65) Prior Publication Data

US 2022/0345644 A1    Oct. 27, 2022

Related U.S. Application Data

(63) Continuation of application No. 17/197,355, filed on Mar. 10, 2021, now Pat. No. 11,418,729, which is a continuation of application No. 16/801,359, filed on Feb. 26, 2020, now Pat. No. 10,979,656, which is a continuation of application No. 16/412,723, filed on May 15, 2019, now Pat. No. 10,616,506, which is a continuation of application No. 16/101,942, filed on Aug. 13, 2018, now Pat. No. 10,341,584, which is a
(Continued)

(30) Foreign Application Priority Data

Sep. 2, 2015  (TW) ................................ 104129150

(51) Int. Cl.
*H04N 5/33* (2023.01)
*H04N 23/71* (2023.01)
*H04N 23/74* (2023.01)
*H04N 23/667* (2023.01)

(52) U.S. Cl.
CPC ............. *H04N 5/33* (2013.01); *H04N 23/667* (2023.01); *H04N 23/71* (2023.01); *H04N 23/74* (2023.01)

(58) Field of Classification Search
CPC ........ H04N 5/33; H04N 23/667; H04N 23/71; H04N 23/74
See application file for complete search history.

(56) References Cited

U.S. PATENT DOCUMENTS 9,136,294 B1 * 9/2015 Pyeoun ............ H01L 27/14627
9,247,234 B2 * 1/2016 Agranov ................... G01C 3/32
(Continued)

FOREIGN PATENT DOCUMENTS

CN      102289131 A    12/2011

*Primary Examiner* — Michael Lee
(74) *Attorney, Agent, or Firm* — HAUPTMAN HAM, LLP

(57) ABSTRACT

An optical module including a light source and an optical sensor is provided. The optical sensor includes a pixel matrix and an opaque layer. The pixel matrix includes a plurality of unblocked pixels, a plurality of first pixels and a plurality of second pixels. The opaque layer covers upon a first region, which is a part of each first pixel, and upon a second region, which is a part of each second pixel, but does not cover upon the unblocked pixels, wherein the first region and the second region are symmetrically arranged in a first direction, and uncovered regions of the first pixels and the second pixels are arranged to be larger at a pixel edge than at a pixel center.

20 Claims, 6 Drawing Sheets

Related U.S. Application Data continuation of application No. 15/189,189, filed on Jun. 22, 2016, now Pat. No. 10,097,773.

(56) References Cited

U.S. PATENT DOCUMENTS

| | | | | |
|---|---|---|---|---|
| 10,097,773 B2* | 10/2018 | Lin | ........................ | H04N 23/71 |
| 10,341,584 B2* | 7/2019 | Lin | ...................... | H04N 23/667 |
| 10,616,506 B2* | 4/2020 | Lin | ........................ | H04N 23/74 |
| 10,979,656 B2* | 4/2021 | Lin | ........................ | H04N 23/71 |
| 11,418,729 B2* | 8/2022 | Lin | ...................... | H04N 23/667 |
| 2011/0116078 A1* | 5/2011 | Cho | .................. | H01L 27/14632 |
| | | | | 356/51 |
| 2012/0274834 A1* | 11/2012 | Gidon | ............... | H01L 27/14627 |
| | | | | 348/E5.055 |
| 2014/0313350 A1* | 10/2014 | Keelan | ................. | H04N 23/843 |
| | | | | 348/188 |
| 2017/0041525 A1* | 2/2017 | Liu | ...................... | H04N 23/672 |

* cited by examiner

OPTICAL MODULE HAVING SYMMETRICAL OPAQUE LAYER

RELATED APPLICATIONS

The present application is a continuation application of U.S. application Ser. No. 17/197,355, filed on Mar. 10, 2021, which is a continuation application of U.S. application Ser. No. 16/801,359, filed on Feb. 26, 2020, which is a continuation application of U.S. application Ser. No. 16/412,723, filed on May 15, 2019, which is a continuation application of U.S. application Ser. No. 16/101,942, filed on Aug. 13, 2018, which is a continuation application of U.S. application Ser. No. 15/189,189, filed on Jun. 22, 2016, which is based on and claims priority to Taiwanese Application Number 104129150, filed Sep. 2, 2015, the disclosure of which is hereby incorporated by reference herein in its entirety.

BACKGROUND

1. Field of the Disclosure

This disclosure generally relates to an optical image sensor and, more particularly, to an imaging device capable of distinguishing foreground and background and an operating method thereof.

2. Description of the Related Art

Activating a predetermined application of a system by recognizing gestures has been broadly applied to various electronic devices, e.g., portable electronic devices or wearable electronic devices. A conventional method for distinguishing foreground and background adopts a system light source to illuminate the object located within an operating range. When the system light source is illuminating light, an image sensor captures a bright image; whereas, when the system light source does not illuminate light, the image sensor captures a dark image. By calculating a differential image between the bright image and the dark image, it is able to cancel the interference from background.

However, the portable electronic device and the wearable electronic device are generally operated under strong light, e.g., under sunlight. As the brightness of the system light source is very weak compared to sunlight, the background interference cannot be effectively cancelled by only calculating the differential image between bright and dark images.

Accordingly, an imaging device without being limited by ambient light intensity is required in the art.

SUMMARY

The present disclosure provides an imaging device capable of distinguishing foreground and an operating method thereof that incorporate the phase detection to overcome the limitation caused by strong ambient light.

The present disclosure further provides an imaging device capable of distinguishing foreground and an operating method thereof that operate in different operating modes under different ambient light intensity.

The present disclosure provides an optical module including a light source and an optical sensor. The optical sensor is configured to operate corresponding to the light source, and includes a pixel matrix and an opaque layer. The pixel matrix includes a plurality of unblocked pixels, a plurality of first pixels and a plurality of second pixels. The opaque layer covers upon a first region, which is a part of each first pixel, and upon a second region, which is a part of each second pixel, but does not cover upon the unblocked pixels, wherein the first region and the second region are symmetrically arranged in a first direction, and uncovered regions of the first pixels and the second pixels are arranged to be larger at a pixel edge than at a pixel center.

The present disclosure further provides an optical module including a light source and an optical sensor. The optical sensor is configured to operate corresponding to the light source, and includes a pixel matrix and an opaque layer. The pixel matrix includes a plurality of unblocked pixels, as well as a plurality of first pixels and second pixels arranged at a part of pixel columns of the pixel matrix. The opaque layer covers upon a first region, which is smaller than an area of covered first pixel, of each first pixel, and upon a second region, which is smaller than an area of covered second pixel, of each second pixel, but does not cover upon the unblocked pixels, wherein uncovered regions of one first pixel and one second pixel are symmetrically arranged and adjacent to each other.

The present disclosure provides an optical module including a light source and an optical sensor. The optical sensor is configured to operate corresponding to the light source, and includes a pixel matrix and an opaque layer. The pixel matrix includes a plurality of unblocked pixels, a plurality of first pixels and a plurality of second pixels arranged in a first direction and a second direction. The opaque layer covers upon a first region which is a part of the first pixels and upon a second region which is a part of the second pixels but does not cover upon the unblocked pixels, wherein the first region and the second region are symmetrically arranged in the first direction, and an uncovered region of one first pixel is adjacent to an uncovered region of one second pixel in the first direction.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
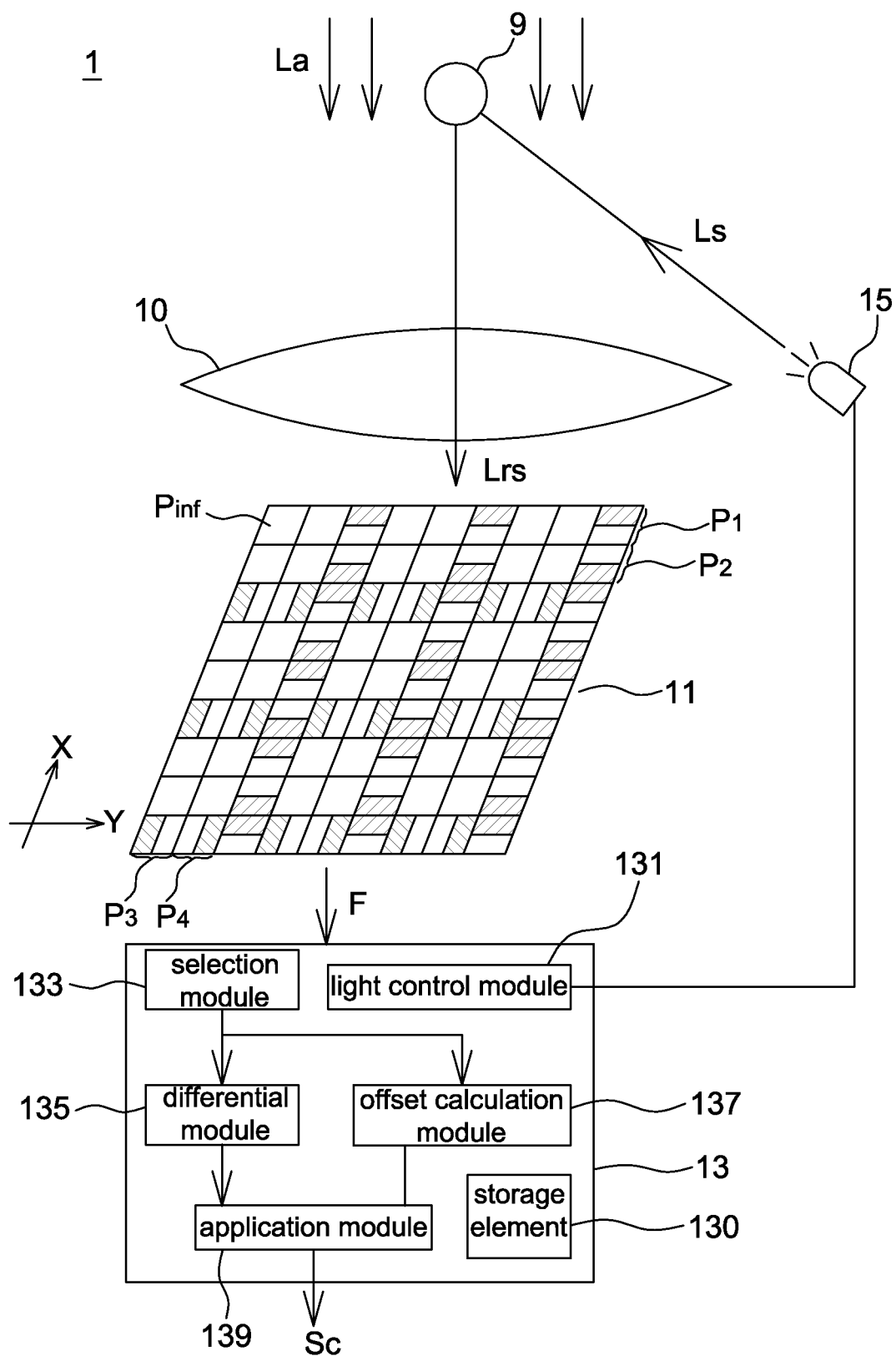
FIG. 1 is a schematic block diagram of an imaging device according to one embodiment of the present disclosure.
Figure 2A:
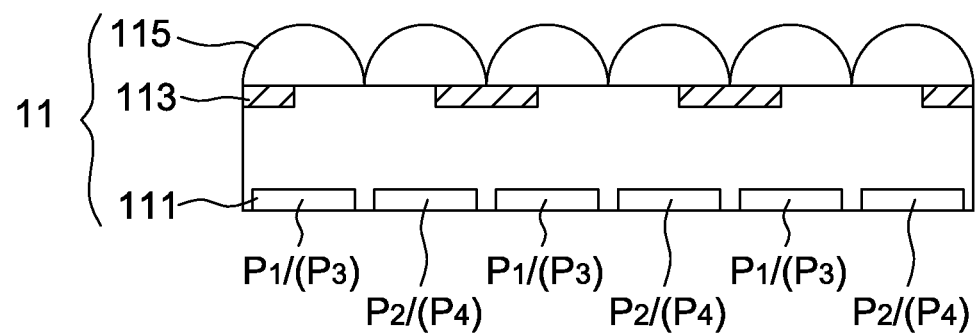
FIGS. 2A-2B are cross sectional views of an image sensor of an imaging device according to some embodiments of the present disclosure.
Figure 2B:
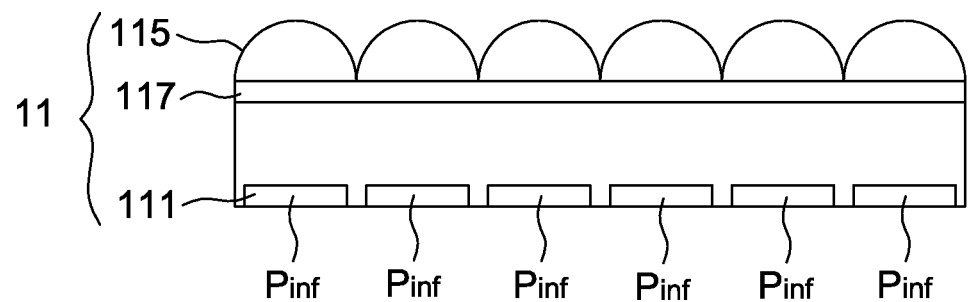
Figure 3A:
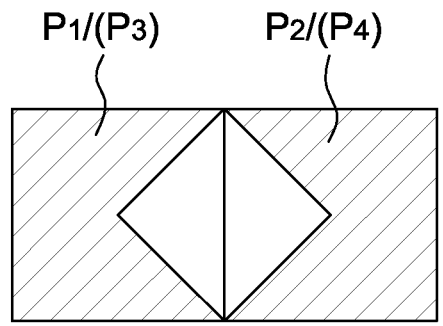
FIGS. 3A-3D are schematic diagrams of the arrangement of an opaque layer according to some embodiments of the present disclosure.
Figure 3B:
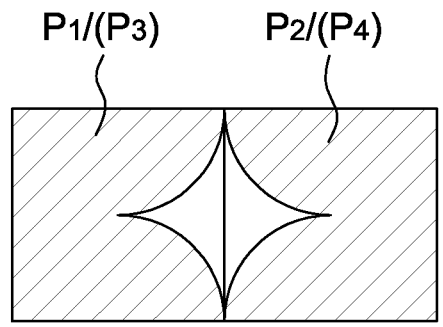
Figure 3C:
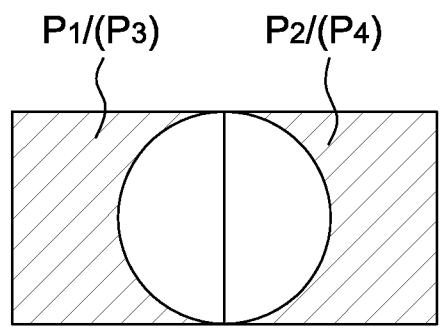
Figure 3D:
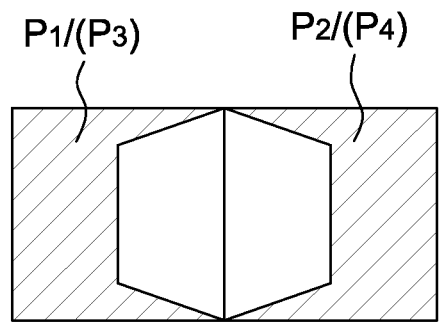

Referring to FIGS. 1 and 2A-2B, FIG. 1 is a schematic block diagram of an imaging device according to one embodiment of the present disclosure; and FIGS. 2A-2B are cross sectional views of an image sensor of an imaging device according to some embodiments of the present disclosure. The imaging device 1 includes a condenser lens 10, an image sensor 11, a processor 13 and an infrared light source 15. In some embodiments, the processor 13 is disposed, for example, in a same chip together with the image sensor 11 and the infrared light source 15. In some embodiments, the processor 13 is, for example, an external processing unit outside the image sensor 11, and is configured to receive and process image frames F captured by the image sensor 11 so as to select a first mode (e.g., a normal mode) or a second mode (e.g., a strong light mode) to separate at least one foreground image from the background image. For example, when the imaging device 1 is applied to the gesture recognition, the at least one foreground image is, for example, a hand of a user or an object held by a user. The processor 13 is, for example, a microcontroller (MCU), a central processing unit (CPU), a digital signal processor (DSP) or the like for processing image frames F outputted by the image sensor 11.

The infrared light source 15 is, for example, a light emitting diode or a laser diode, and is configured to emit infrared light Ls to illuminate an operable range of the imaging device 1, wherein the operable range is determined, for example, by element parameters of the imaging device 1. When an object 9 enters the operable range, the object 9 reflects the infrared light Ls toward the image sensor 11 to generate reflected light beams Lrs. In some embodiments, the imaging device 1 includes at least one optical element (not shown) to homogenize the light emitted by the infrared light source 15.

The condenser lens 10 is, for example, arranged in a lens of an image capturing device (e.g., a camera), and is a single lens or a lens set arranged along an optical axis without particular limitations. For simplification, a single lens is shown herein. The condenser lens 10 is served as a lens window configured to condense the reflected light beams Lrs from the object 9 or ambient light La, and guide the reflected light beams Lrs and the ambient light La to the image sensor 11. A distance between the condenser lens 10 and the image sensor 11 is preferably equal to a first focal length of the condenser lens 10 (e.g., the focal length close to a side of the image sensor 11). It is appreciated that when the ambient light La exists, the reflected light beams Lrs also contains a part of ambient light reflected by the object 9.

The image sensor 11 (e.g., a pixel matrix being shown herein) senses, based on a predetermined focal length, light (e.g., reflected light beams Lrs and ambient light La) penetrating the condenser lens 10 and outputs an image frame F. For example, the image sensor 11 outputs a bright image frame when the infrared light source 15 is turned on, and outputs a dark image frame when the infrared light source 15 is turned off. The image sensor 11 includes a pixel matrix (e.g., a 9×9 pixel matrix being shown herein), an opaque layer 113, a plurality of microlenses 115 and an infrared filter layer 117 (e.g., referring to FIGS. 2A and 2B), wherein the opaque layer 113 is patterned to cover at least a part of a plurality of pixels included in the pixel matrix 111 such that uncovered regions of the pixels receive incident light of different phases through different parts of the microlenses 115. The predetermined focal length is referred to a second focal length formed by the condenser lens 10 and the microlens 115 together as well as at a light incident side of the condenser lens 10. In the present disclosure, the predetermined focal length is sometimes referred to a predetermined focal length of the condenser lens 10 or the image sensor 11.

It is noticed that when an object 9 is at the second focal length (e.g., the focal length away from the image sensor 11, i.e. the predetermined focal length) of the condenser lens 10 to reflect the infrared light Ls or ambient light La to the imaging device 1, the object image in the image frame F outputted by the image sensor 11 does not have a position offset in the subframe corresponding to pixels under different cover patterns; whereas, when the object 9 is not at the second focal length, the object image in the image frame F outputted by the image sensor 11 has a position offset toward different directions in the subframe corresponding to pixels under different cover patterns (illustrated by examples below). Accordingly, it is possible for the imaging device 1 to identify whether the object 9 is a foreground image within the operable range by identifying whether the position offset is within a predetermined range. In other words, the imaging device 1 of the present disclosure has an operable range, and the imaging in the image frame F of an object within the operable range is referred to a foreground image herein.

In one embodiment, the pixel matrix 111 includes a plurality of infrared pixels $P_{inf}$, a plurality of first pixels $P_1$ and a plurality of second pixels $P_2$ arranged along a first direction (e.g., X direction) and a second direction (e.g., Y direction). It should be mentioned that in the present disclosure, the first pixels $P_1$ and the second pixels $P_2$ are referred to pixels with different regions covered by the opaque layer 113. For example, in a monochromatic image sensor, structures of the first pixels $P_1$ and the second pixels $P_2$ are identical, but only cover patterns of the opaque layer 113 thereupon are different (as shown in FIG. 1). For example, in a color image sensor, the first pixels $P_1$ and the second pixels $P_2$ respectively include red pixels (e.g., red filter layer being formed thereon), green pixels (e.g., green filter layer being formed thereon), blue pixels (e.g., blue filter layer being formed thereon) or pixels of other colors, and cover patterns of the opaque layer 113 upon the first pixels $P_1$ and the second pixels $P_2$ are different. The infrared pixels $P_{inf}$ are covered by an infrared filter layer 117 but are not covered by the opaque layer 113.

The opaque layer 113 is, for example, formed by the metal layer served as electrical paths (e.g., at least one layer of M1 to M10 in the CMOS process), a black light blocking layer formed in addition to said metal layer or a combination thereof without particular limitations as long as the opaque layer 113 is able to block a part of incident light. In this embodiment, the opaque layer 113 covers upon a first region (e.g., the region filled with oblique lines) of the first pixels $P_1$ and upon a second region (e.g., the region filled with oblique lines) of the second pixels $P_2$. In FIG. 1, the first region is at a side of the pixel along the first direction (e.g., X direction), and the second region is at a side of the pixel along an inverse direction of the first direction. The first region of the first pixels 1 and the second region of the second pixels are mirror-symmetrically arranged in the first direction. In addition, The first pixels $P_1$ further include an uncovered region (e.g., blank region) outside the first region, and the second pixels $P_2$ further include an uncovered region (e.g., blank region) outside the second region, wherein the uncovered region of the first pixels $P_1$ and the uncovered region of the second pixels $P_2$ receive incident light of different phases through different parts of the microlenses 115 (as shown in FIG. 2A).

For example in FIG. 1, the first region of the first pixels $P_1$ is at an upper side of the first pixels $P_1$, and the second region of the second pixels $P_2$ is at a lower side of the second pixels $P_2$. It should be mentioned that although FIG. 1 shows that the first region and the second region are substantially 50% of an area of a single pixel, it is only intended to illustrate but not to limit the present disclosure. In other embodiments, the first region and the second region are 5% to 95% of an area of a single pixel without particular limitations.

The microlenses 115 are disposed upon the pixel matrix 111, and respectively aligned with one pixel. The opaque layer 113 and the infrared filter layer 117 are sandwiched between the pixel matrix 111 and the microlenses 115, wherein distances between the opaque layer 113 and the pixel matrix 111 and between the infrared filter layer 117 and the pixel matrix 111 may or may not be identical without particular limitations. Accordingly, the first pixels $P_1$ and the second pixels $P_2$ receive incident light of different phases respectively through a first part of the microlenses 115 (e.g., the lower part of the microlenses 115 in FIG. 1 and the right part of the microlenses 115 in FIG. 2A) and a second part of the microlenses 115 (e.g., the upper part of the microlenses 115 in FIG. 1 and the left part of the microlenses 115 in FIG. 2A). It should be mentioned that although FIG. 2A shows that uncovered regions of the first pixels $P_1$ and the second pixels $P_2$ are substantially a half of the microlenses 115, it is only intended to illustrate but not to limit the present disclosure. It is appreciated that light capable of penetrating the microlenses 115 to reach the uncovered regions is determined by the cover pattern of the opaque layer 113. In the present disclosure, the first part and the second part of the microlenses 115 are arranged as 5% to 95% of the microlenses 115 without particular limitations.

In FIG. 1, the pixel matrix 111 further includes a plurality of third pixels $P_3$ and a plurality of fourth pixels $P_4$ arranged along the second direction (e.g., Y direction). The opaque layer 113 further covers upon a third region (e.g., the region filled with oblique lines) of the third pixels $P_3$ and upon a fourth region (e.g., the region filled with oblique lines) of the fourth pixels $P_4$, wherein the third region is at a side of the pixel along the second direction (e.g., Y direction), and the fourth region is at a side of the pixel along an inverse direction of the second direction. For example in FIG. 1, the third region is at the left side of the third pixels $P_3$, and the fourth region is at the right side of the fourth pixels $P_4$, and the third region and the fourth region are mirror-symmetrically arranged in the second direction.

More specifically, the opaque layer 113 covers upon the pixel matrix 111, and includes a first cover pattern covering upon a first region of the first pixels $P_1$, a second cover pattern covering upon a second region of the second pixels $P_2$, a third cover pattern covering upon a third region of the third pixels $P_3$, and a fourth cover pattern covering upon a fourth region of the fourth pixels $P_4$, wherein the first region and the second region are mirror-symmetrically arranged in a first direction, and the third region and the fourth region are mirror-symmetrically arranged in a second direction. In one embodiment, the first direction is perpendicular to the second direction. It should be mentioned that the arrangement of the first pixels $P_1$ to the fourth pixels $P_4$ is not limited to that shown in FIG. 1, and preferable the first pixels $P_1$ to the fourth pixels $P_4$ are uniformly arranged everywhere in the pixel matrix 111. In addition, in some embodiments the pixel matrix 111 includes only the first pixels $P_1$ and the second pixels $P_2$, or includes only the third pixels $P_3$ and the fourth pixels $P_4$ according to different applications.

In one embodiment, all of the first region, the second region, the third region and the fourth region of the pixel matrix 111 have identical areas (as shown in FIG. 1), e.g., 5% to 95% of an area of a single pixel.

It should be mentioned that although FIG. 1 shows that the first region and the second region are rectangles mirror symmetrical in a first direction, and the third region and the fourth region are rectangles mirror symmetrical in a second direction, it is only intended to illustrate but not to limit the present disclosure. In other embodiments, the first region to the fourth region are not rectangles. For example referring to FIGS. 3A to 3D, the uncovered regions (e.g., the blank region) of the first region to the fourth region are arranged to increase or monotonically increase along a predetermined direction (e.g., a direction in which two pixels adjacent to each other), and shapes thereof are mirror-symmetrical in the predetermined direction. When the first pixels $P_1$ (or the third pixels $P_3$) and the second pixels $P_2$ (or the fourth pixels $P_4$) are receiving incident light, as the phase difference between the received incident lights close to the center of the first pixels $P_1$ (or the third pixels $P_3$) and close to the center of the second pixels $P_2$ (or the fourth pixels $P_4$) is not obvious, whereas the phase difference between the received incident lights close to the edge of the first pixels $P_1$ (or the third pixels $P_3$) and close to the edge of the second pixels $P_2$ (or the fourth pixels $P_4$) is more obvious, the uncovered region close to the pixel edge is arranged to be larger than the uncovered region close to the pixel center so as to improve the accuracy of the phase detection. It should be mentioned that FIGS. 3A-3D are only intended to illustrate but not to limit the present disclosure.

Figure 4:
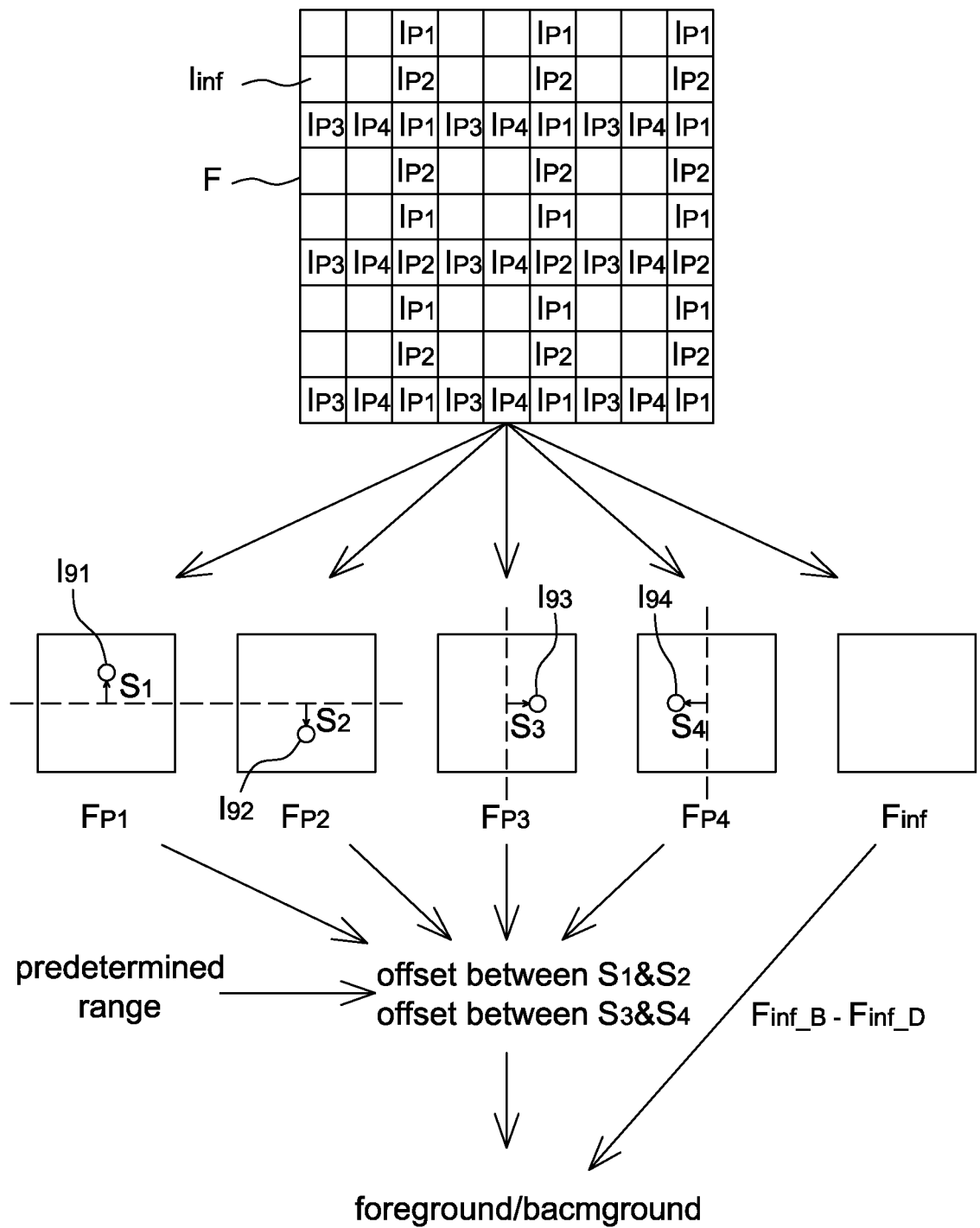
FIG. 4 is a schematic diagram of an operating method of an imaging device according to one embodiment of the present disclosure.

The processor 13 is configured to form an infrared subframe $F_{inf}$ according to infrared image regions $I_{inf}$ in the bright image frame and the dark image frame corresponding to the infrared pixels $P_{inf}$, form a first subframe $F_{P1}$ according to first image regions $I_{P1}$ in the bright image frame and the dark image frame corresponding to the first pixels $P_1$ and form a second subframe $F_{P2}$ according to second image regions $I_{P2}$ in the bright image frame and the dark image frame corresponding to the second pixels $P_2$, as shown in FIG. 4. The processor 13 also calculates, in a first mode, a differential image between the infrared subframe $F_{inf\_B}$ of the bright image frame and the infrared subframe $F_{inf\_D}$ of the dark image frame to separate at least one foreground image, or separates, in a second mode, at least one foreground image according to the first subframe $F_{P1}$ and the second subframe $F_{P2}$, wherein the first mode is, for example, a normal mode and the second mode is, for example, a strong light mode. More specifically, the first subframe $F_{P1}$ is formed by gray level data outputted by the first pixels $P_1$, the second subframe $F_{P2}$ is formed by gray level data outputted by the second pixels $P_2$, and the infrared subframe $F_{inf}$ is formed by gray level data outputted by the infrared pixels $P_{inf}$.

When the pixel matrix 111 includes the arrangement of four pixel types, the processor 13 is further configured to form a third subframe $F_{P3}$ according to third image regions $I_{P3}$ in the bright image frame and the dark image frame corresponding to the third pixels $P_3$ and form a fourth subframe $F_{P4}$ according to fourth image regions $I_{P4}$ in the bright image frame and the dark image frame corresponding to the fourth pixels $P_4$, as shown in FIG. 4. More specifically, the third subframe $F_{P3}$ is formed by gray level data outputted by the third pixels $P_3$, and the fourth subframe $F_{P4}$ is formed by gray level data outputted by the fourth pixels $P_4$.

Referring to FIG. 1 again, the processor 13 includes a light control module 131, a selection module 133, a differential module 135, an offset calculation module 137 and an application module 136, wherein the light control module 131, the selection module 133, the differential module 135, the offset calculation module 137 and the application module 136 are implemented by software and/or hardware without particular limitations. For illustration purposes, the light control module 131, the selection module 133, the differential module 135, the offset calculation module 137 and the application module 136 are shown to be separated from each other herein, but operations thereof are considered to be accomplished by the processor 13. The processor 13 preferably further includes a storage element 130 configured to previously store parameters required during operation, e.g., a predetermined offset range corresponding to an operable range.

The light control module 131 is configured to control the infrared light source 15 to turn on or turn off corresponding to the image capturing of the image sensor 11 such that the image sensor 11 captures and outputs a bright image frame corresponding to the turning-on of the infrared light source 15, and captures and outputs a dark image frame corresponding to the turning-off of the infrared light source 15.

The selection module 133 of the processor 13 is configured to select an operation mode according to the image frame F outputted by the image sensor 11. In one embodiment, the selection module 133 of the processor 13 selects the first mode or the second mode according to an average brightness of the dark image frame. For example, the selection module 133 of the processor 13 calculates only an average brightness of the infrared image regions $I_{inf}$ of the dark image frame or calculates an average brightness of the whole dark image frame, and compares the average brightness with a brightness threshold (e.g., stored in the storage element 130). When the average brightness is smaller than the brightness threshold, it means that the ambient light La is not too strong and thus the first mode is entered. Accordingly, the first mode is referred to a normal mode or a weak light mode herein. When the average brightness is larger than the brightness threshold, it means that the ambient light La is strong and thus the second mode is entered. Accordingly, the second mode is referred to a strong light mode herein.

As mentioned above, when the ambient light La is too strong, the brightness difference between the bright image frame and the dark image frame is not obvious. Accordingly, in another embodiment, the selection module 133 of the processor 13 selects the first mode or the second mode according to an average brightness difference between the bright image frame and the dark image frame. When the average brightness difference is larger than a brightness difference threshold (e.g., stored in the storage element 130), it means that the ambient light La is not too strong and thus the first mode is entered. When the average brightness difference is smaller than the brightness difference threshold, it means that the ambient light La is strong and thus the second mode is entered.

Figure 5:
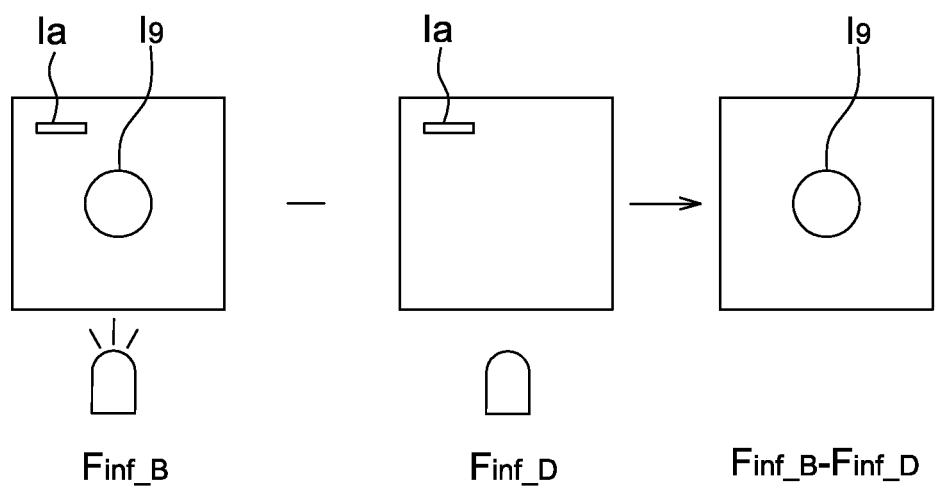
FIG. 5 is a schematic diagram of an operating method of a first mode of an imaging device according to one embodiment of the present disclosure.
Figure 6:
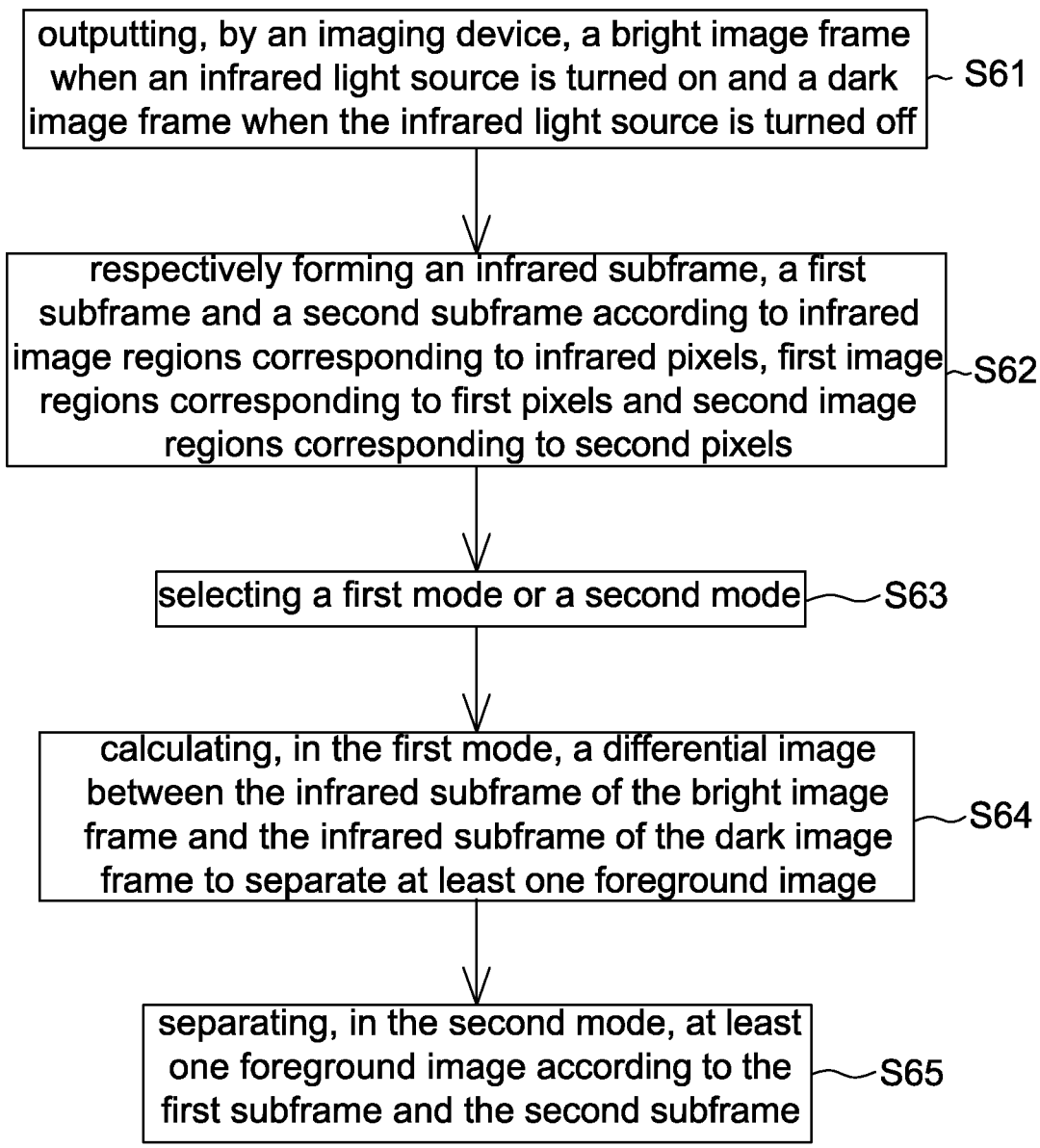
FIG. 6 is a flow chart of an operating method of an imaging device according to one embodiment of the present disclosure.

Referring to FIG. 5, it is an operating method of a first mode of the present disclosure. In the first mode, the differential module 135 of the processor 13 calculates a difference between the infrared subframe $F_{inf\_B}$ of the bright image frame outputted by the image sensor 11 and the infrared subframe $F_{inf\_D}$ of the dark image frame outputted by the image sensor 11. For example, it is assumed that the infrared subframe $F_{inf\_B}$ includes an object image $I_9$ and a background image Ia, whereas the infrared subframe $F_{inf\_D}$ includes only a background image Ia. When the infrared subframe $F_{inf\_D}$ is subtracted from the infrared subframe $F_{inf\_B}$, a differential image ($F_{inf\_B}-F_{inf\_D}$) only contains the object image $I_9$ thereby removing the interference from the background image.

Referring to FIGS. 1 and 4, the operation of the second mode is illustrated hereinafter. In this embodiment, a dot object 9 located at a light incident side of the condenser lens 10 is taken as an example for illustration purposes. The image sensor 11 captures, based on a predetermined focal length, and outputs an image frame F (e.g., a bright image frame or a dark image frame) to the processor 13. It is assumed that the selection module 133 selects to enter the second mode, and the offset calculation module 137 of the processor 13 divides the image frame F into a first subframe $F_{P1}$ and a second subframe $F_{P2}$, wherein the first subframe $F_{P1}$ is associated with the first pixels $P_1$ and the second subframe $F_{P2}$ is associated with the second pixels $P_2$. As mentioned above, when the object 9 is at the second focal length (i.e. the predetermined focal length) of the condenser lens 10, image regions associated with the object 9 in the first subframe $F_{P1}$ and the second subframe $F_{P2}$ are substantially at corresponding positions without having an offset. When the object 9 is not at the second focal length of the condenser lens 10, image regions associated with the object 9 in the first subframe $F_{P1}$ and the second subframe $F_{P2}$ have an offset therebetween and are not at corresponding positions. The offset calculation module 137 of the processor 13 separates at least one foreground image according to the first subframe $F_{P1}$ and the second subframe $F_{P2}$ of the bright image frame or the dark image frame. As mentioned above, when the ambient light La is strong enough, the brightness difference between the bright image frame and the dark image frame is not obvious, and thus a foreground image is separable according to each of the bright image frame and the dark image frame.

For example, FIG. 4 shows that a first image region $I_{91}$ in the first subframe $F_{P1}$ shifts upward by $S_1$ from a center line (e.g., dashed line), and a second image region $I_{92}$ in the second subframe $F_{P2}$ shifts downward by $S_2$ from a center line (e.g., dashed line). The offset calculation module 137 of the processor 13 then calculates a first offset between $S_1$ and $S_2$, e.g., ($S_1-S_2$). It should be mentioned that the calculation of the offset is not limited to take the center line as a reference line, and the center line is taken herein only for illustration purposes. It is also possible to implement the calculation of the offset by the block matching or motion detection without particular limitations as long as the first offset between corresponded image regions (e.g., $I_{91}$ and $I_{92}$) in the first subframe $F_{P1}$ and the second subframe $F_{P2}$ is obtainable, wherein whether two image regions are corresponded to each other is identified according to, for example, the brightness or shape of the two image regions. The offset calculation module 137 of the processor 13 identifies at least one image region corresponding to the first offset within a predetermined range as at least one foreground image, and identifies the image region outside the predetermined range as the background image.

When the pixel matrix 111 includes the arrangement of four pixel types, the offset calculation module 137 of the processor 13 further divides the image frame F into a third subframe $F_{P3}$ and a fourth image frame $F_{P4}$, wherein the third frame $F_{P3}$ is associated with the third pixels $P_3$ and the fourth subframe $F_{P4}$ is associated with the fourth pixels $P_4$. In the second mode, the offset calculation module 137 of the processor 13 separates at least one foreground image according to the third subframe $F_{P3}$ and the fourth subframe $F_{P4}$ of the bright image frame or the dark image frame.

For example, FIG. 4 shows that a third image region $I_{93}$ in the third subframe $F_{P3}$ shifts rightward by $S_3$ from a center line (e.g., dashed line), and a fourth image region 194 in the fourth subframe $F_{P4}$ shifts leftward by $S_4$ from a center line (e.g., dashed line). The offset calculation module 137 of the processor 13 then calculates a second offset between $S_3$ and $S_4$, e.g., ($S_3$–$S_4$). As mentioned above, the calculation of the offset is not limited to use the subtraction. The offset calculation module 137 of the processor 13 identifies at least one image region corresponding to the second offset within a predetermined range as at least one foreground image, and identifies the image region outside the predetermined range as the background image.

As mentioned above, the predetermined range is previously stored in the storage element 130, and is an offset corresponding to an operable range of the imaging device 1. In other words, when the first offset and/or the second offset exceeds the predetermined range, it means that the image region belongs to the background image.

It should be mentioned that although FIG. 4 shows that the first image region $I_{91}$ shifts upward by $S_1$, the second image region $I_{92}$ shifts downward by $S_2$, the third image region $I_{93}$ shifts rightward by $S_3$ and the fourth image region $I_{94}$ shifts leftward by $S_4$, it is only intended to illustrate but not to limit the present disclosure. The shift direction of the image region corresponding to the object 9 is determined according to whether the object 9 is close to or away from the condenser lens 10 from the second focal length as well as the cover pattern of the opaque layer 113 upon the first pixels $P_1$ to the fourth pixels $P_4$, and is not limited to that shown in FIG. 4.

The application module 139 outputs a control signal Sc according to at least one foreground image bring identified, e.g., outputting the control signal Sc according to a moving direction, speed and a variation of number of the least one foreground image to control the operation of an application program.

It should be mentioned that, in this embodiment the image region is illustrated with a circle (i.e. corresponding to the dot object 9), but the present disclosure is not limited thereto. The image region may be any part in the image frame F, e.g., edges, capable of clearly showing the offset without particular limitations.

In addition, in order to improve the identification accuracy, the processor 13 further calibrates brightness of the first subframe $F_{P1}$ and the second subframe $F_{P2}$ to be substantially identical using a shading technique. Accordingly, it is able to correctly identify the corresponded image regions (e.g., image regions having identical brightness) in the first subframe $F_{P1}$ and the second subframe $F_{P2}$, e.g., $I_{91}$ and $I_{92}$. When the pixel matrix 111 includes the arrangement of four pixel types, the processor 13 further calibrates brightness of the third subframe $F_{P3}$ and the fourth subframe $F_{P4}$ to be substantially identical using the shading technique. Accordingly, it is able to correctly identify the corresponded image regions (e.g., image regions having identical brightness) in the third subframe $F_{P3}$ and the fourth subframe $F_{P4}$, e.g., $I_{93}$ and $I_{94}$.

Referring to FIGS. 1, 2A-2B and 4-6, FIG. 6 is a flow chart of an operating method of an imaging device according to one embodiment of the present disclosure. The operating method is, for example, applicable to the imaging device 1 of FIG. 1. As mentioned above, the imaging device 1 includes an infrared light source 15, a plurality of infrared pixels $P_{inf}$, a plurality of first pixels $P_1$, a plurality of second pixels $P_2$ and a plurality of microlenses 115. The first pixels $P_1$ and the second pixels $P_2$ respectively receive incident light of different phases through a first part and a second part of the microlenses 115. For example, FIG. 1 shows that the first part is at a lower part of the pixel and the second part is at an upper part of the pixel, but the position and ratio with respect to the pixel of the first and second parts are not limited to those shown in FIG. 1.

The operating method of this embodiment includes the steps of: outputting, by an imaging device, a bright image frame when an infrared light source is turned on and a dark image frame when the infrared light source is turned off (Step S61); respectively forming an infrared subframe, a first subframe and a second subframe according to infrared image regions corresponding to infrared pixels, according to first image regions corresponding to first pixels and according to second image regions corresponding to second pixels (Step S62); selecting a first mode or a second mode (Step S63); calculating, in the first mode, a differential image between the infrared subframe of the bright image frame and the infrared subframe of the dark image frame to separate at least one foreground image (Step S64); and separating, in the second mode, at least one foreground image according to the first subframe and the second subframe (Step S65).

Step S61: The light control module 131 of the processor 13 controls the infrared light source 15 to turn on and turn off corresponding to the image capturing of the image sensor 11 such that the image sensor 11 outputs a bright image frame corresponding to the turning-on of the infrared light source 15 and outputs a dark image frame corresponding to the turning-off of the infrared light source 15. More specifically, a frame rate of the image sensor 11 is at least twice of a lighting frequency of the infrared light source 15, e.g., two times, four times and so on.

Step S62: The image sensor 11 outputs every image frame F being captured (e.g., the bright image frame and the dark image frame) to the processor 11 for the post-processing. For example, the processor 11 forms an infrared subframe $F_{inf}$ according to infrared image regions $I_{inf}$ in every image frame F corresponding to the infrared pixels $P_{inf}$, forms a first subframe $F_{P1}$ according to first image regions $I_{P1}$ in every image frame F corresponding to the first pixels $P_1$, and forms a second subframe $F_{P2}$ according to second image regions $I_{P2}$ in every image frame F corresponding to the second pixels $P_2$, as shown in FIG. 4. The method of forming the subframe is to recombine pixels according to their original positions in the image frame F so as to form the infrared subframe $F_{inf}$, the first subframe $F_{P1}$ and the second subframe $F_{P2}$.

In some embodiment, the imaging device 1 further includes a plurality of third pixels $P_3$ and a plurality of fourth pixels $P_4$ respectively receive incident light of different phases through a third part and a fourth part of the microlenses 115. For example, FIG. 1 shows that the third part is at the right side of the pixel and the fourth part is at the left part of the pixel, but the position and ratio with respect to the pixel of the third part and fourth parts are not limited to those shown in FIG. 1. In the embodiment shown in FIG. 1, the first part and the second part are at two opposite sides along a first axis (e.g., X axis) of the microlenses 115, and the third part and the fourth part are at two opposite sides along a second axis (e.g. Y axis) of the microlenses 115.

When the pixel matrix 111 includes the arrangement of four pixel types, in the Step S62 the processor 11 further forms a third subframe $F_{P3}$ according to third image regions $I_{P3}$ in every image frame F corresponding to the third pixels $P_3$, and forms a fourth subframe $F_{P4}$ according to fourth image regions $I_{P4}$ in every image frame F corresponding to the fourth pixels $P_4$. In some embodiments, in the first mode the differential module 135 of the processor 13 generates the infrared subframe $F_{inf}$ without generating the first subframe $F_{P1}$ to the fourth subframe $F_{P4}$; and in the second mode, the offset calculation module 137 of the processor 13 generates the first subframe $F_{P1}$ to the fourth subframe $F_{P4}$ without generating the infrared subframe $F_{inf}$.

Step S63: The selection module 133 of the processor 13 identifies whether ambient light is too strong according to average brightness of the image frame F. In one embodiment, the selection module 133 of the processor 13 selects a first mode or a second mode according to an average brightness value of the dark image frame. In another embodiment, the selection module 133 of the processor 13 selects a first mode or a second mode according to an average brightness difference between the bright image frame and the dark image frame. In the present disclosure, the first mode is, for example, a normal mode or a weak light mode, and the second mode is, for example, a strong light mode. Accordingly, the processor 13 is able to select a proper algorithm according to the intensity of ambient light so as to separate at least one foreground image.

Step S64: When the ambient light is not too strong, a first mode is entered. In this case, the differential module 135 of the processor 13 directly calculates a differential image between the infrared subframe $F_{inf\_B}$ of the bright image frame and the infrared subframe $F_{inf\_D}$ of the dark image frame to separate at least one foreground image $I_9$ as shown in FIG. 5. More specifically, gray values outputted by the infrared pixels $P_{inf}$ are calculated in the normal mode without being calculated in the strong light mode.

Step S65: When the ambient light is strong, the second mode is entered. In this case, the offset calculation module 137 of the processor 13 calculates at least one first offset (e.g., $S_1$ and $S_2$ shown in FIG. 4) according to the first subframe $F_{P1}$ and the second subframe $F_{P2}$, and identifies at least one image region corresponding to the first offset within a predetermined range as at least one foreground image. As mentioned above, the predetermined range is a predetermined offset range corresponding to an operable range.

When the matrix pixel 111 includes the arrangement of four pixel types, in the Step S65, the offset calculation module 137 of the processor 13 further calculates at least one second offset (e.g., $S_3$ and $S_4$ shown in FIG. 4) according to the third subframe $F_{P3}$ and the fourth subframe $F_{P4}$, and identifies at least one image region corresponding to the second offset within a predetermined range as at least one foreground image. It should be mentioned that the foreground images identified according to the first offset and the second offset are not necessary to be identical, and the identified foreground images may partially identical or totally different according to image features in the image frame F.

Finally, the application module 139 of the processor 13 outputs a control signal Sc according to the identified foreground image to perform different applications, e.g., performing the gesture recognition.

In addition, in order to improve the identification accuracy, the processor 13 calibrates brightness of the first subframe $F_{P1}$ and the second subframe $F_{P2}$ to be substantially identical using a shading technique, and calibrates brightness of the third subframe $F_{P3}$ and the fourth subframe $F_{P4}$ to be substantially identical using the shading technique such that, during calculating the offset, corresponded image regions in the first subframe $F_{P1}$ and the second subframe $F_{P2}$ are easier to be found, and corresponded image regions in the third subframe $F_{P3}$ and the fourth subframe $F_{P4}$ are easier to be found.

As mentioned above, the conventional gesture recognition system may not operate accurately under strong ambient light. Therefore, the present disclosure provides an imaging device (e.g., FIG. 1) and an operating method thereof (e.g., FIG. 6) that separate the foreground image using different algorithms under different ambient light intensity so as to overcome the problems of the conventional gesture recognition system.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical module, comprising:
   a light source;
   multiple microlenses;
   an optical sensor, configured to operate corresponding to the light source, and comprising:
      a pixel matrix comprising a plurality of unblocked pixels, a plurality of first pixels and a plurality of second pixels, wherein each of the first pixels and the second pixels is aligned with and under one microlens among the multiple microlenses; and
      an opaque layer covering upon a first region, which is a part of each first pixel, and upon a second region, which is a part of each second pixel, but not covering upon the unblocked pixels, wherein
   the first region and the second region are symmetrically arranged in a first direction, and
   uncovered regions of the first pixels and the second pixels are arranged to have a larger width in a second direction perpendicular to the first direction closer to a pixel edge in the first direction, and taper from both ends of the pixel edge toward a pixel center to improve accuracy of phase detection.

2. The optical module as claimed in claim 1, wherein
   the pixel matrix further comprises a plurality of third pixels and a plurality of fourth pixels,
   the opaque layer further covers upon a third region, which is a part of each third pixel, and upon a fourth region, which is a part of each fourth pixel, and
   the third region and the fourth region are symmetrically arranged in the second direction.

3. The optical module as claimed in claim 2, wherein the first region, the second region, the third region and the fourth region are 5% to 95% of an area of a single pixel.

4. The optical module as claimed in claim 2, wherein the third pixels and the fourth pixels are arranged at a part of pixel rows of the pixel matrix.

5. The optical module as claimed in claim 1, wherein one first pixel having the first region covered by the opaque layer and one second pixel having the second region covered by the opaque layer are two adjacent pixels in the first direction.

6. The optical module as claimed in claim 1, wherein the uncovered regions of the first pixels and the second pixels are arranged to monotonically increase toward the pixel edge.

7. The optical module as claimed in claim 1, wherein the first pixels and the second pixels are arranged at a part of pixel columns of the pixel matrix.

8. The optical module as claimed in claim 1, wherein the unblocked pixels are covered by a filter layer.

9. The optical module as claimed in claim 8, wherein the opaque layer and the filter layer are at a same layer.

10. The optical module as claimed in claim 8, wherein a distance between the opaque layer and the pixel matrix is different from that between the filter layer and the pixel matrix.

11. An optical module, comprising:
a light source;
multiple microlenses;
an optical sensor, configured to operate corresponding to the light source, and comprising:
    a pixel matrix comprising a plurality of unblocked pixels, as well as a plurality of first pixels and second pixels arranged at a part of pixel columns of the pixel matrix, wherein each of the first pixels and the second pixels is aligned with and under one microlens among the multiple microlenses; and
    an opaque layer covering upon a first region, which is smaller than an area of covered first pixel, of each first pixel, and upon a second region, which is smaller than an area of covered second pixel, of each second pixel, but not covering upon the unblocked pixels, wherein
uncovered regions of one first pixel and one second pixel are symmetrically arranged and directly adjacent to each other in a first direction to enlarge a phase difference between light received by the one first pixel and light received by the one second pixel, and
the uncovered regions of the one first pixel and the one second pixel are arranged to have a larger width in a second direction, which is perpendicular to the first direction, closer to a pixel edge between the one first pixel and the one second pixel, and taper from the pixel edge respectively toward a pixel center of the one first pixel and a pixel center of the one second pixel.

12. The optical module as claimed in claim 11, wherein the pixel matrix further comprises a plurality of third pixels and fourth pixels arranged at a part of pixel rows of the pixel matrix,
the opaque layer further covers upon a third region, which is smaller than an area of covered third pixel, of each third pixel, and upon a fourth region, which is smaller than an area of covered fourth pixel, of each fourth pixel, and
uncovered regions of one third pixel and one fourth pixel are symmetrically arranged and adjacent to each other.

13. The optical module as claimed in claim 12, wherein the first region, the second region, the third region and the fourth region are 5% to 95% of an area of a single pixel.

14. The optical module as claimed in claim 11, wherein in each of the first pixels and the second pixels, the uncovered region increases or monotonically increases from the pixel center toward the pixel edge.

15. The optical module as claimed in claim 11, wherein the unblocked pixels are covered by a filter layer.

16. The optical module as claimed in claim 15, wherein the opaque layer and the filter layer are at a same layer.

17. The optical module as claimed in claim 15, wherein a distance between the opaque layer and the pixel matrix is different from that between the filter layer and the pixel matrix.

18. An optical module, comprising:
a light source;
multiple microlenses;
an optical sensor, configured to operate corresponding to the light source, and comprising:
    a pixel matrix comprising a plurality of unblocked pixels, a plurality of first pixels and a plurality of second pixels arranged in a first direction and a second direction wherein each of the first pixels and the second pixels is aligned with and under one microlens among the multiple microlenses; and
    an opaque layer covering upon a first region which is a part of the first pixels and upon a second region which is a part of the second pixels but not covering upon the unblocked pixels, wherein
the first region and the second region are symmetrically arranged in the first direction, and
an uncovered region of one first pixel is directly adjacent to an uncovered region of one second pixel in the first direction to enlarge a phase difference between light received by the one first pixel and light received by the one second pixel, and
uncovered regions of the one first pixel and the one second pixel are arranged to have a larger width in the second direction closer to a pixel edge between the one first pixel and the one second pixel, and taper from the pixel edge respectively toward a pixel center of the one first pixel and a pixel center of the one second pixel.

19. The optical module as claimed in claim 18, wherein the pixel matrix further comprises a plurality of third pixels and a plurality of fourth pixels,
the opaque layer further covers upon a third region which is a part of the third pixels and upon a fourth region which is a part of the fourth pixels, and
the third region and the fourth region are symmetrically arranged in the second direction.

20. The optical module as claimed in claim 18, wherein the first region, the second region, the third region and the fourth region are 5% to 95% of an area of a single pixel.

* * * * *